Oct. 30, 1945.  G. P. SMITH ET AL  2,387,861
ACCOUNTING MACHINE
Filed Dec. 30, 1943  3 Sheets-Sheet 1
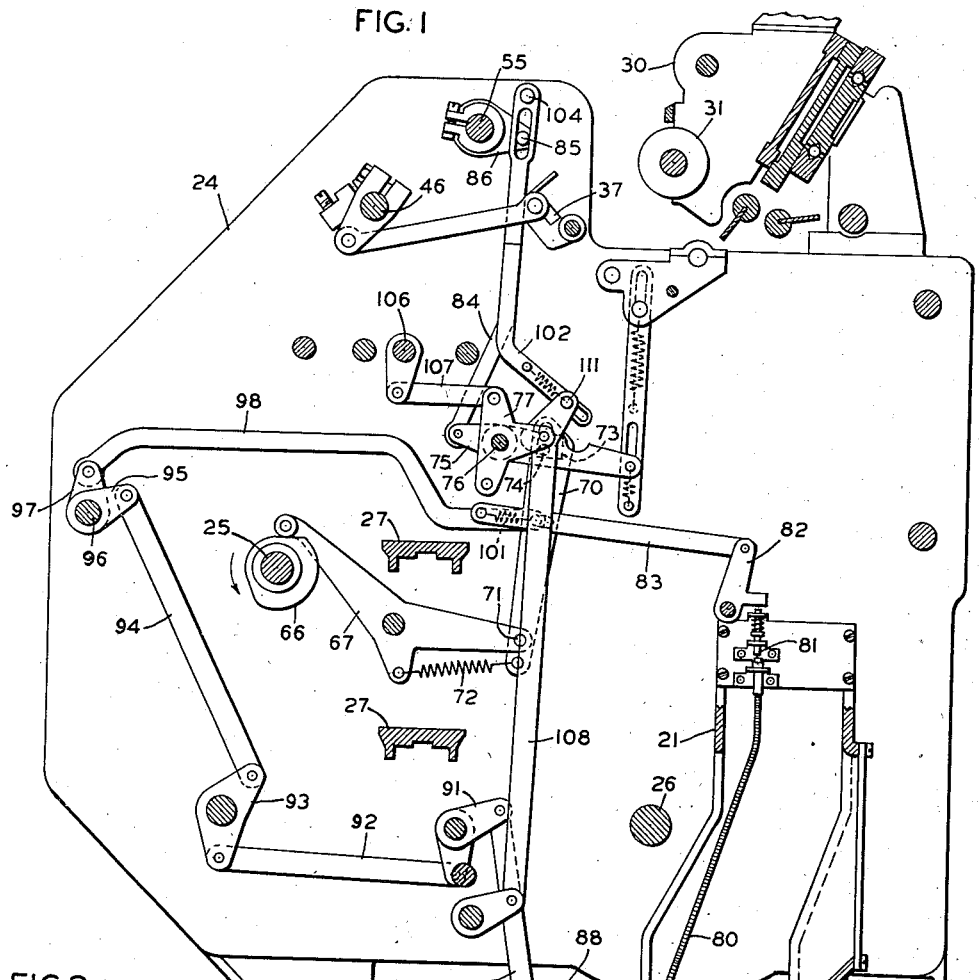
INVENTORS
GEORGE P. SMITH AND
FLOYD C. GRESSEL.
BY John L Sterling
ATTORNEY Oct. 30, 1945.  G. P. SMITH ET AL  2,387,861
ACCOUNTING MACHINE
Filed Dec. 30, 1943  3 Sheets-Sheet 2

INVENTORS
GEORGE P. SMITH AND
FLOYD C. GRESSEL
BY
ATTORNEY

Oct. 30, 1945.   G. P. SMITH ET AL   2,387,861
ACCOUNTING MACHINE
Filed Dec. 30, 1943          3 Sheets-Sheet 3

INVENTORS
GEORGE P. SMITH AND
FLOYD C. GRESSEL
BY
ATTORNEY

Patented Oct. 30, 1945

2,387,861

UNITED STATES PATENT OFFICE 2,387,861

ACCOUNTING MACHINE

George P. Smith, Snyder, and Floyd C. Gressel, Ilion, N. Y., assignors to Remington Rand Inc., Buffalo, N. Y., a corporation of Delaware Application December 30, 1943, Serial No. 516,226

5 Claims. (Cl. 101—93)

The invention relates to printing accounting machines and more particularly to the means in such machines for the automatic printing of the zeros included in or associated with printed numbers.

The invention has for its principal object to provide means whereby numbers may be printed in the ordinary style including zeros only at the right of the highest digit, and also in another style including zeros at the left of the highest digit. The latter form of printed number is sometimes desired, as, for example, when printing checks. Means are provided whereby some numbers are printed in the ordinary way and others in the latter way. In the instance chosen to illustrate the invention, the machine automatically prints the items from a group of punched cards as usual, with zeros only to the right of the highest digit of each number, and it automatically prints the totals with zeros both to the right and also to the left of said digits.

The invention has for one of its objects to provide means settable by the operator of the machine to predetermine which of a series of printing elements shall have the mode of operation above outlined and which shall not. The controls may be pre-set in different ways, some of them so as always to print zeros only at the right of the highest digit and others so as to print in that manner in some machine cycles, and in other cycles to print zeros also to the left of the highest digit. Preferably, the controls may also be set so as not to print zeros at all. It is thus possible for the operator to set the mechanism up in a variety of ways, and to set it in one way for one job and to change the setting for another job.

To the above and other ends which will appear in the course of the description, the invention consists of certain features of construction and certain combinations and arrangements of parts, all of which will be fully described herein and particularly pointed out in the claims.

One instance of the invention is illustrated in the accompanying drawings, in which Fig. 1 is a right hand side elevation with parts in section just inside the right hand frame piece and showing some of the operating and control mechanism of a Powers tabulating machine having the invention applied thereto;

Fig. 2 is a fragmentary view of a portion of Fig. 1 but on a larger scale than Fig. 1 and with some parts removed;

Figure 5:
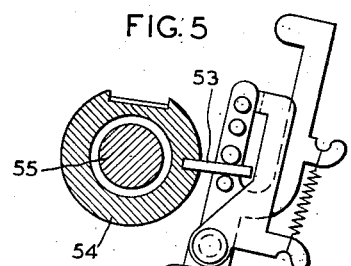
Figure 6:
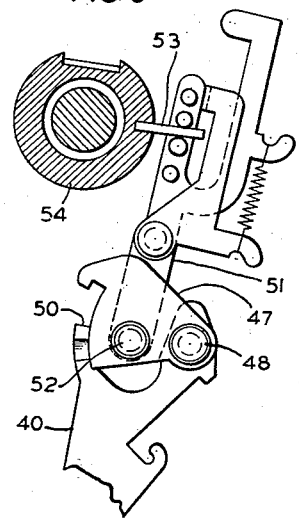
Figure 7:
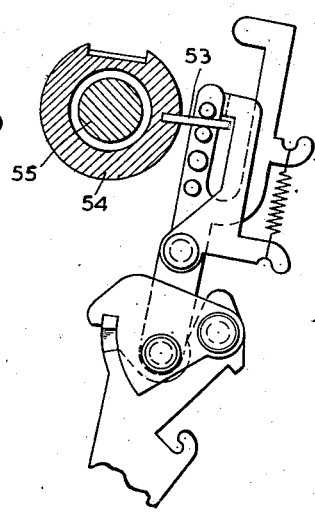
Figure 11:
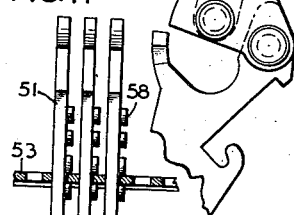
Figure 8:
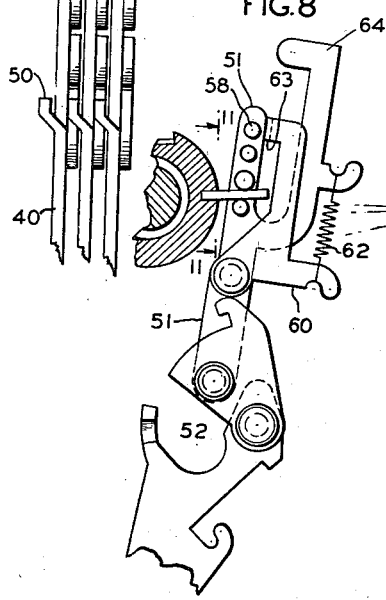
Figure 9:
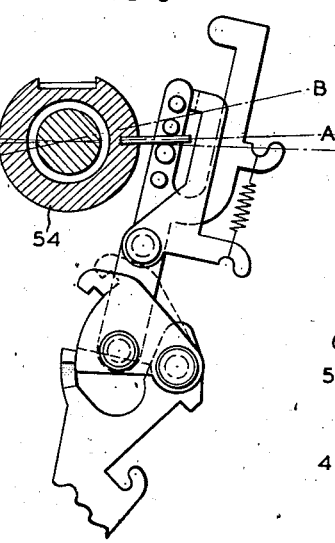
Figure 10:
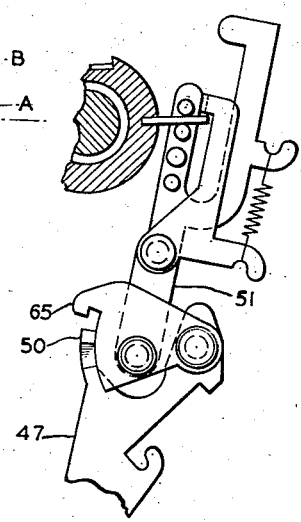
Figure 12:
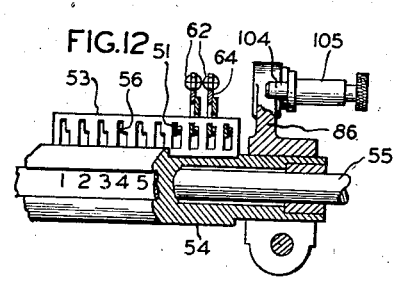

Figs. 5–10, inclusive, on a larger scale than the other figures, are right hand views of the upper end portion of a single hammer latch and its controls, said controls being in different positions in the different views. Figs. 8, 9, and 10 show three settings of the controls, with the operating device in normal position; and Figs. 5, 6, and 7 show, respectively, the same three settings but with said operating device in operated position;

Fig. 11 is a front view of three of the hammer latches and their controls, with a certain flange in section on the line 11—11 of Fig. 8;

Fig. 12 is a fragmentary top view of a few of the controls and the device which operates them; and Fig. 13 shows a sample of printing according to the invention.

By way of illustration, the invention is shown applied to a Powers tabulating machine of the sort described in the patent to Lasker and Mueller No. 2,323,816 patented July 6, 1943, and also in the application of J. Mueller for Letters Patent for Accounting machine filed February 1, 1940, S. N. 316,739. In said machine, punched cards are fed through a sensing chamber where such sensing pins as find holes raise set pins 20, Fig. 1 which, through Bowden wires in the translator 21, set up in the machine stops which control the various functions of the machine and among other things, control the setting of type bars 22, Fig. 3. The machine comprises a base section 23, Fig. 1, surmounted by a head section having right and left frame members 24 and two drive shafts, namely, a forward shaft 25 and a rear shaft 26, each of which makes one rotation per machine cycle. Cross bars 27 support accumulators 19 which are operated by rack teeth on the lower parts of the type bars 22. The paper carriage 30 supports a platen 31 against which the types 32 on the type bar are driven to print.

Figure 3:
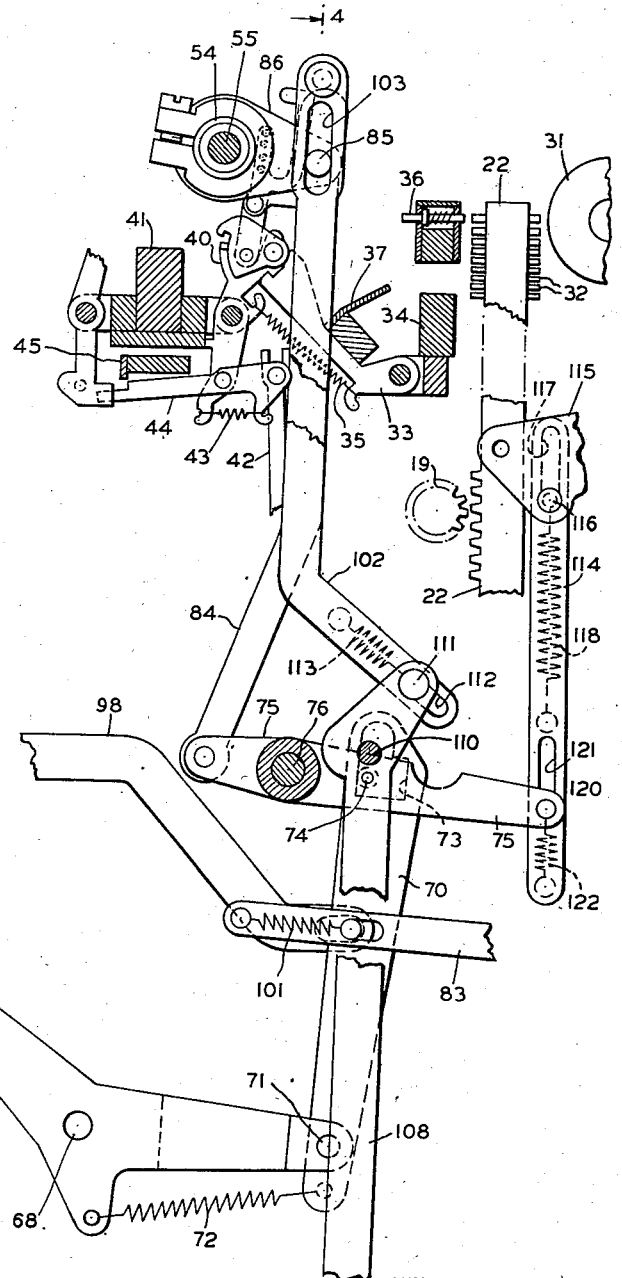
Fig. 3 is a right hand view of the mechanism of and associated with the invention, with some parts in section and some broken away.

The type hammers 33, Fig. 3, are pivoted to a frame bar 34 and when fired are impelled by springs 35 to strike pins 36 one for each type bar which pins drive the types against the paper. The type hammers have a restoring bar 37 and are normally latched against operation by latches 40, a series of which are pivoted on a frame bar 41. When any type bar rises above its zero printing position, a link 42 moves downward permitting a spring 43 to swing clockwise a release link 44 so as to bring a shoulder on said link into the path of movement of a flange on a print bar 45. Said print bar at the moment of printing makes a short vibration toward the rear releasing any latch whose release link 47 has been moved into engagement with it. The restoring bar 37 and release bar 45 are operated at proper times by a print shaft 46 which is vibrated by cams on the drive shaft 25. The mechanism thus far described is that of the Powers machine above referred to. The train of devices individual to each type bar for causing the selected type on that bar to print, viz, in the present instance, the hammer 33, the latch 40, the release link 41 and the link 42, are herein called an impact train.

The present invention has to do with the devices, sometimes called zero connectors or zero print devices, of the kind which are settable to active and inactive positions so as to print zeros or not as desired. These connectors, in the form chosen to illustrate the invention, are best shown in Figs. 5 to 10. Each of them consists of a segmental piece 47 pivoted to the latch 40 and adapted to co-act with a lug 50 off-set to the left from the next latch 40 to the right. The forward edge of the connector 47 is made in the arc of a circle so that as the connector is adjusted up and down by rocking it about its pivot 48 this edge remains contiguous to the lug 50. The construction is such that if, when the parts are in the position shown in Figs. 6, 7, 9, and 10 the latch be swung toward the left, releasing its type bar, it will carry with it the next latch to the right and so on as far as the connectors are so set; but if one of said connectors is set in one of the positions shown in Figs. 5 and 8 and in broken lines in Fig. 9 then the motion of this latch will not be communicated to the next one and the zero printing will be split at that point.

The connectors are moved to the various positions shown in Figs. 5–10 by the following means: Each of them has a link 51 pivoted thereto at 52 and extending upward and in effect pivoted to a flange 53 projecting from a sleeve 54 which sleeve is loosely pivoted on a certain shaft 55, (Figs. 1, 3, and 12). As best shown in Fig. 12, the flange 53 has a series of slots 56 through which the links 51 extend and by which they are guided. Each of these slots is broader at its forward end than at its rear end. The link 51 has several lugs or extrusions 58 and the forward part of the slot 56 is wide enough to allow the link to be slid up and down in the slot including the extrusions 58; but if the link be moved into the rear end of the slot, the said extrusions 58 will extend one above and one below the flange and the link will thereby be in effect pivoted to the flange. Each link has an arm 60 pivoted thereto of 61 and influenced counter-clockwise by a spring 62. This arm is so designed that the front edge of it extends up behind the flange 53 and it is prevented from being pressed against said flange by a sort of foot 63 which is pressed by the spring 62 against the rear edge of the link 51. The said link is thus held in the narrow part of the slot but without any binding due to the spring 62. The link 51 has a branch 64 extending upward and adapted to be used as a handle to adjust the link. In the form of the invention shown there are four of the lugs 58 affording three settings to the link as illustrated in Figs. 8 to 10. In each of said settings one of the lugs 58 is above and in another below the flange.

As thus far described, this connector mechanism differs slightly in detail from, but is substantially the same as, that described in the prior application S. N. 316,739, and as described and claimed in the application for Letters Patent filed by John Mueller January 26, 1944, S. N. 519,733, which is a division of the said application S. N. 316,739. As described in that application the sleeve 57 may be rocked to two positions which can be understood by reference to Fig. 9 which shows the sleeve in its normal position where the flange 53 extends in the direction indicated by the broken line A. In this figure the link 51 is set in its middle position in which, normally, the rear edge of the connector 57 registers with the lug 50 so that if the latch be swung counter-clockwise it will carry with it the next latch to the right; but the sleeve can be swung by certain means to position B which will raise the connector 47 to the dotted line position of Fig. 9 in which position the zero print is split; in other words this latch will not operate the next one to its right.

In Figs. 8, 9, and 10 the sleeve 54 is shown in its normal position, the link 53 being set in its highest position in Fig. 8 and its middle position in Fig. 9 and in its lowest position in Fig. 10. It will be noted that in Fig. 8 the connector is normally out of engagement with the lug 50 and if the sleeve be rocked counter-clockwise from the A position to the B position (Fig. 9) the connector will be raised still higher and there will still be no zero printing caused thereby. In Fig. 10 the connector is set in its lowest normal position where it will cause zero printing and this position is so low that even if the sleeve 54 be rocked counter-clockwise raising the connector, the latter will still communicate its motion to the next latch. In short, in the setting of Fig. 8, no zero printing is caused at all and this setting is therefore appropriate for type bars that are to be used only for printing alphabetical characters. In the setting of Fig. 9, zero printing is normally caused but will be interrupted if the sleeve be rocked counter-clockwise. In Fig. 10 there will be zero printing whether or not the sleeve is rocked. It will be understood that sleeve 54 may be rocked counter-clockwise by whatever means may be appropriate to the work in hand. In the Mueller mechanism, the corresponding sleeve is rocked counterclockwise, under the control of a special or control hole in a card. Where a group of cards contains some punched to print alpha in a column that is normally used for numbers, the connectors in that column will be set as in Fig. 9 and the alpha cards will be punched with the control hole. If there should be a field where numbers are to be printed under both conditions the connectors in that field will be set as shown in Fig. 10; and in a field used always for alpha, they will be set as in Fig. 8. The mechanism for this purpose is retained in the present case and will be described hereinafter.

According to the present invention, the Mueller zero printing mechanism is extended to provide means whereby zeros may be printed both at the right and at the left of the printed number, a mode of operation that is sometimes desired, as for example, when printing checks.

Preferably, the mechanism is so constructed that it may be set up and used as above described, and in addition, on some cycle in which that mode of operation is desired, the hammer latches in a selected field of the printing, may be coupled together so as to print zeros to the left of the other digits as well as to the right. One set-up of the connectors thus affords three different results, all of which, may, if desired, be used in the printing of a single group of cards. This may be accomplished by rocking the sleeve 54 in the direction opposite to that above described so as to swing the flange 53 and the connectors 47 downward from their normal position instead of upward. Each connector has a lug 65, shown in the form of a hook, so placed that if the link 51 be set in its lowest position shown in Fig. 10 this lug will stand normally a little above lug 50 of the next latch to the right, and if then the sleeve 54 be rocked clockwise to the position shown in Fig. 7, this lug will move down in front of the lug 50 thus locking the two latches 57 together. When the connectors in any field are set in this position, the swinging of any latch will swing all the rest of the latches in that field with it so that all of said latches will be released at every printing operation, printing the zeros before as well as after the other digits.

In the Powers machine as manufactured, the sleeve corresponding to the sleeve 54, has heretofore been rocked counterclockwise under card control by the means now to be described. A cam 66 on the drive shaft 25 rocks a follower lever 67 pivoted at 68 and carrying an upright link 70 which is urged clockwise (Figs. 1 and 3) about its pivot 71 by a spring 72. At its upper end said link has an L-shaped opening 73 (Fig. 2) in which lies a pin 74 projecting from a lever 75 which is pivoted on the same fixed stud 76 as a certain bell crank 77 (Fig. 1) and the spring 72 normally holds the lever rearward with the forward edge of the opening 73 pressed against the pin 74, as shown. As the link is moved down and up by the cam 66, it rubs idly over the pin without operating the lever 75. In the latter part of each cycle, at the time when the sensing pins are moving up to sense the card, the link 70 is in its high position and the pin 74 is therefore in the lower part of the opening 73. When a card is sensed having a special control hole, the sensing pin for said hole pushes up the set pin 20, which, through Bowden wire 80 and pin 81, rocks a bell crank 82 which, through a link 83, engaging a pin 89 on link 70 rocks said link 70 leftward in Figs. 1, 2, and 3, bringing the horizontal limb of the L-shaped opening 73 into engagement with the pin 74. When, in the first part of the next cycle, the link 70 moves downward, it rocks the lever 75 clockwise and holds it in rocked position until the printing has been done. At its forward end, said lever carries a link 84, which is pivoted at 85 (Fig. 4) to an arm 86 fast on the sleeve 54. The sleeve is thus rocked counter-clockwise under control of a card.

In order to prevent a card from causing the sleeve 54 to be rocked as just described on total taking operations, the following means are employed: The total taking control unit 87 of the Powers machine, includes certain cams and certain levers 88 which pull certain links 90. One of these, through bell crank 91, link 92, bell crank 93, link 94, and arm 95, "pulls" (rocks clockwise in Fig. 1) a certain "credit balance shaft" 96 very early in the blank stroke and holds it pulled until near the end of the total stroke; and this shaft is utilized to disable the link 70 during that period. An arm 97 on said shaft pushes a link 98 which (Fig. 2) has a slot 100 engaging the pin 74 on link 70. On item cycles said link may be swung frontward, the pin moving in the slot; but on total taking the front end of the slot engages the pin and prevents the arm from swinging. To make this possible, the card controlled link 83 also engages the pin 74 by a slot and a spring 101 normally holds the pin in the front end of it. When a card having the control hole in it, is in the sensing chamber during a total taking operation, the link 83 is pushed frontward, but the link 70 is held in its rear position by the link 98, and the link 83 therefore only stretches the spring 101 without causing a rocking of the sleeve 54 to change the zero set-up.

Figure 4:
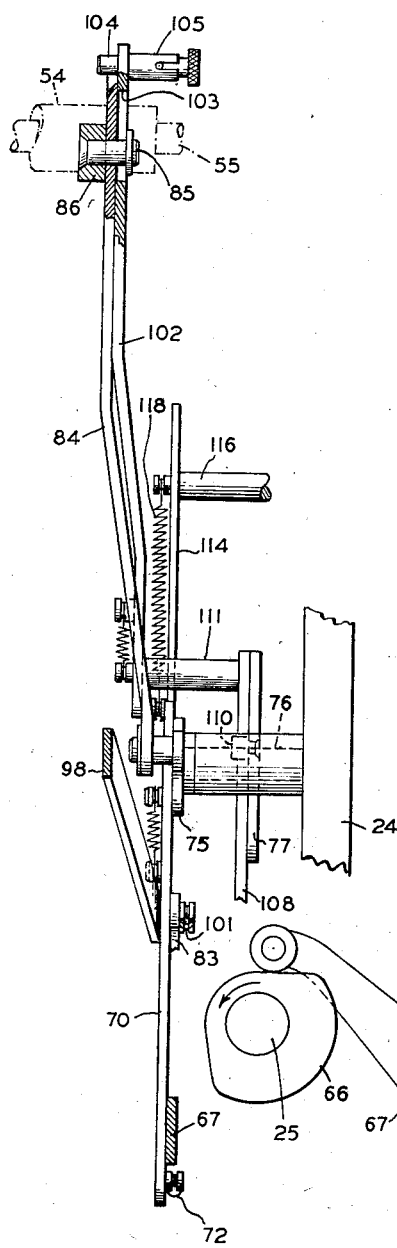
Fig. 4 is a front elevation of Fig. 3, partly in section on the line 4—4 of Fig. 3, and with some parts omitted.

In order to rock the sleeve 54 clockwise in the drawings to cause all zeros to be printed, the following means are provided: A link 102 (Figs. 3 and 4), is guided at its upper end by the pin 85 of arm 86 of the sleeve 54, engaging in a longitudinal slot 103 in said link. Said link carries a plunger 104, which, when projected as shown in Fig. 4, lies above the end of the link 84 and, when said link 102 is pulled downward, the said plunger will pull down said link 84 and rock the sleeve 54 to depress the connectors 47 as above described, so that in any field where the connectors have been set as in Fig. 10, all of the latches of that field will be locked together, as shown in Fig. 7. The plunger 104 is preferably made retractable into a housing 105 in a familiar manner, thus disabling the link 102.

The link 102 may be operated by any suitable means, depending on the machine to which the invention is applied and the use to which it is to be put. In the present instance, the tabulating machine is used to summate a group of cards representing various items; and it is desired that all zeros be printed only on total taking cycles.

The total taking control mechanism of the Powers tabulating machine includes a so-called "total" shaft 106 which is "pulled" (rocked counter-clockwise in Fig. 1) by a link 107, the bell crank 77, and a link 108 which last is pivoted to said bell crank at 110 and is pulled by one of the links 90. The bell crank 77 is omitted in Fig. 3 for clearness. The link 108 is prolonged at its upper end, where it is furnished with a pin or post III (Figs. 3 and 4) which engages in a slot 112 in the rearwardly inclined lower part of the link 102. A spring 113 holds said pin yieldingly in the upper end of the slot and transmits the downward motion of the link 108 when the latter is operated.

The operation of the described mechanism is as follows: On normal item cycles, the sleeve 54 remains in its middle position shown in all of the drawings except Figs. 5, 6, and 7, and the printing is of the style suitable for items. An alphabetic card punched with the control hole, causes link 83 to swing link 70 frontward, whereupon said link, when pulled by the cam 66, rocks the lever 75 clockwise, pushing up on link 84 and rocking the sleeve 54 counter-clockwise to set the printing to the style suitable for the alphabetic line of print. The link 84 carries the link 102 up with it, the slot 112 in the lower end of the latter sliding on the pin 111 and stretching the spring 113. On a total taking cycle the link 70 is held inactive by the link 98, and the link 108 pulls down the link 102 and rocks the sleeve 54 clockwise, changing the set-up of the zero couplers to the style desired for totals, as shown in Figs. 5, 6, and 7. The link 102 carries the link 84 down with it, rocking the lever 75 counter-clockwise, but this does no harm.

The lever 75 is thus rocked from a normal middle position first in one direction and then in the other. It is held in and returned to such middle position by a centering device comprising a link 114 (Fig. 3) which is mounted on a fixed bracket 115 by a pin 116 engaging in a slot 117 in the link. A spring 118 normally holds the link up with the pin 116 engaging the bottom of the slot. A pin 120 on the lever 75 plays in a slot 121 in the lower end of the link and is urged to the bottom of the slot by a spring 122. Counter-clockwise motion of the lever 75 stretches the spring 122 and clockwise turning pulls down the link 117, stretching the spring 118.

In Fig. 13, the designation "105" in the left hand column, has zeros printed only to the right of the highest digit, but no zero is desired in the alphabetic heading line between the "J" and the "N." The controls in that field were therefore set as in Fig. 9, and a control hole was punched in the heading card. On the first cycle, therefore, the connectors, 47 were pulled up to the position shown in broken lines, and no zeros were printed. In the field at the right where amounts are printed, the connectors were set as in Fig. 10, in which zeros are normally printed only at the right; but on the total cycle they were moved down to the position of Fig. 7, and all zeros were printed.

The connectors are shown in a form suitable for application to the manufactured Powers machine, which form may be modified in applications to other machines. Various other changes may be made in the details of construction and arrangement without departing from the invention.

What I claim as new and desire to secure by Letters Patent is:

1. In the printing mechanism of an accounting or like machine comprising a series of denominational type bars and impact trains one for each type bar, the combination of connectors between the successive impact trains each settable to two positions in one of which it transmits the action of one impact train to the next train of lower order and in the other one of which it also transmits such action to the next train of higher order.

2. In the printing mechanism of an accounting or like machine comprising a series of denominational type bars and impact trains one for each type bar, the combination of connectors between the successive impact trains each settable to two positions in one of which it transmits the action of one impact train to the next train of lower order and in the other one of which it also transmits such action to the next train of higher order, and means to shift said connectors en bloc from one of said positions to the other.

3. In the printing mechanism of an accounting or like machine which machine comprises adding mechanism and a series of denominational type bars, impact trains one train for each type bar, and total taking control mechanism, the combination of connectors between the successive impact trains each settable to two positions in one of which it transmits the action of one impact train to the next train of lower order and in the other of which it also transmits such action to the next train of higher order, and means controlled by said total taking control mechanism to shift said connectors en bloc from one of said positions to the other.

4. In the printing mechanism of an accounting or like machine comprising a series of denominational type bars and impact trains one for each type bar, the combination of connectors between the successive impact trains each settable to two positions in one of which it transmits the action of one impact train to the next train of lower order and in the other one of which it also transmits such action to the next train of higher order, said connectors being individually pre-settable relative to said shifting means so as in both positions of the latter to transmit the action of one impact train only to the next one of lower order.

5. In the printing mechanism of an accounting or like machine, the combination with the type hammers, the hammer latches, and the zero connectors pre-settable for different styles of printing including one in which each connector communicates its releasing movement to the next latch to its right, of lugs on said connectors, and means to shift said connectors en bloc to positions in which said lugs communicate each the releasing movement of one latch to the next latch to the left.

GEORGE P. SMITH.
FLOYD C. GRESSEL.